April 12, 1949.　　　R. H. IVESON　　　2,467,134
AUTOMATIC SWITCH

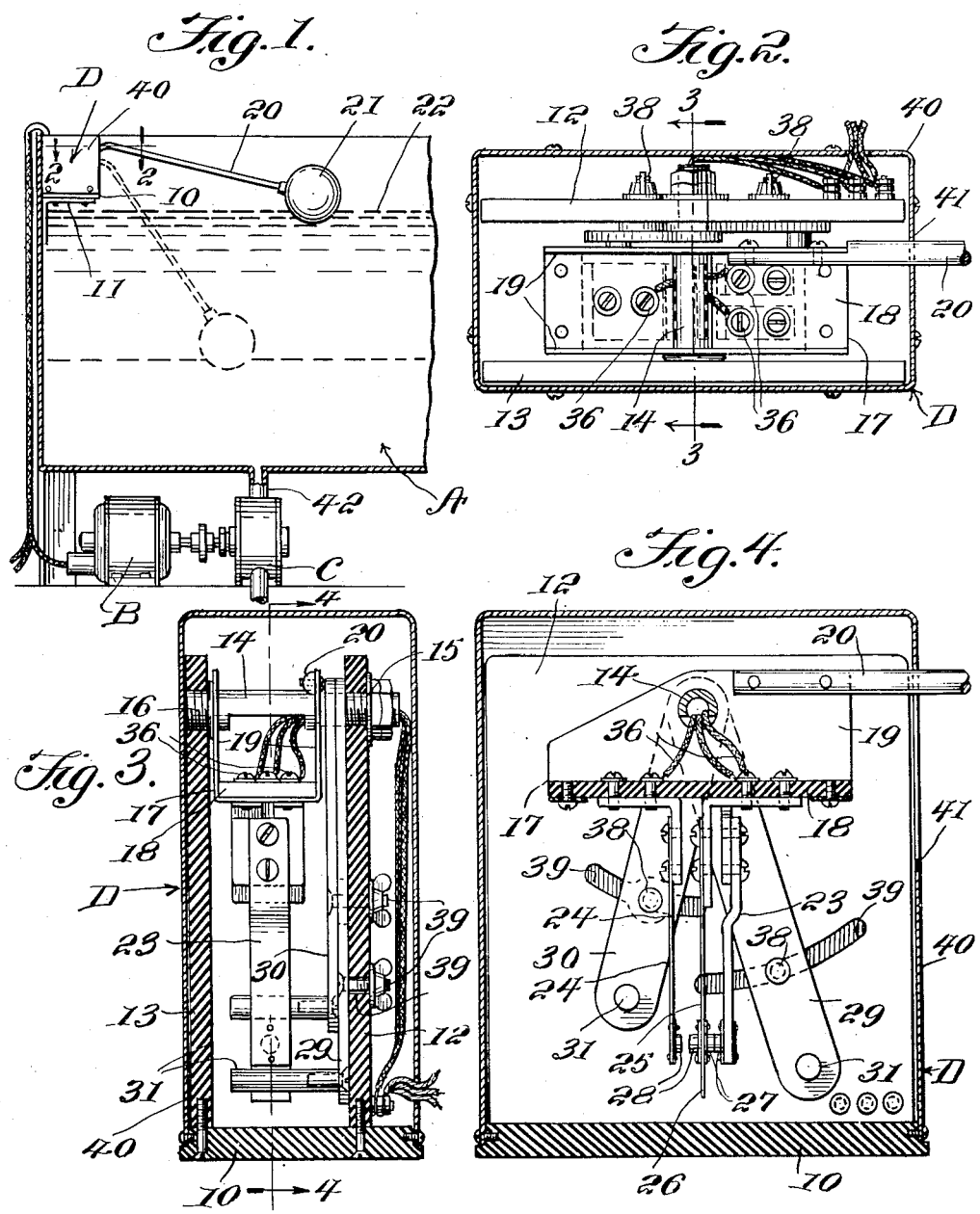

Filed June 7, 1944　　　　　　　　　　　3 Sheets-Sheet 3

Robert H. Iveson, INVENTOR.

BY
Victor J. Evans & Co.
ATTORNEYS

Patented Apr. 12, 1949

2,467,134

UNITED STATES PATENT OFFICE 2,467,134

AUTOMATIC SWITCH

Robert H. Iveson, Barstow, Calif.

Application June 7, 1944, Serial No. 539,091

5 Claims. (Cl. 200—84)

1

The invention relates to an automatically operated electric switch controlling device, and more especially to a float actuated electric circuit breaker device.

The primary object of the invention is the provision of a device of this character, wherein by the shiftable mounting of two pairs of electric contacts, and in the arrangement thereof, that movement to one position, as in the sinking or lowering of a float to a predetermined minimum level, will close two contacts and energize a main magnetic switch, causing it to close and hold by shifting control to the other pair of contacts, until movement to the opposite, maximum level of the float is reached, and then opens this other pair of contacts, thereby releasing the switch for the opening of the same.

Another object of the invention is the provision of a device of this character, wherein an electric motor driven pump will be automatically controlled, and such control is maintained by the action of a float, controlling a circuit breaker, for example to regulate water or other liquid supply to a reservoir, container or the like in that such water or other liquid will be cut-off when a predetermined maximum level is reached, and such supply turned on when reaching a determined minimum level within the said reservoir, container or the like, with the result that an overflow is prevented, as well as relieving the pump from excessive operation, together with wear on the motor driving the same.

A further object of the invention is the provision of a device of this character, which is simple in construction, thoroughly reliable and efficient in operation, readily and easily adjusted for varying the control action thereof, strong, durable, it being readily accessible for inspection and repairs, and inexpensive to manufacture and install.

With these and other objects in view the invention consists in the features of construction, combination and arrangement of parts as will be hereinafter more fully described, illustrated in the accompanying drawings, which disclose the preferred and modified forms of construction of the invention, and hereinafter pointed out in the claims annexed hereto.

In the accompanying drawings:

Figure 1 is a fragmentary elevation, partly in section of a liquid tank and motor driven pump with the device constructed in accordance with the invention installed therewith.

Figure 2 is an enlarged sectional view taken on

2 the line 2—2 of Figure 1 looking in the direction of the arrows.

Figure 3 is a sectional view taken on the line 3—3 of Figure 2 looking in the direction of the arrows.

Figure 4 is a sectional view taken on the line 4—4 of Figure 3 looking in the direction of the arrows.

Figure 5:
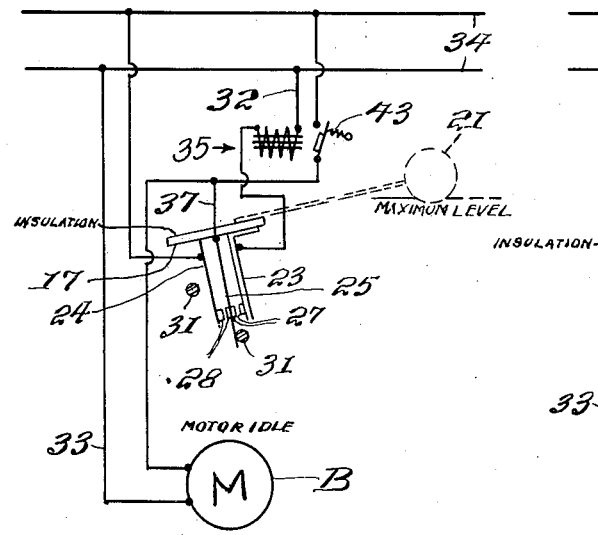

Figure 5 is a schematic view showing the position of the device when the float is at maximum level with the magnetic switch open and the motor idle.

Figure 6:
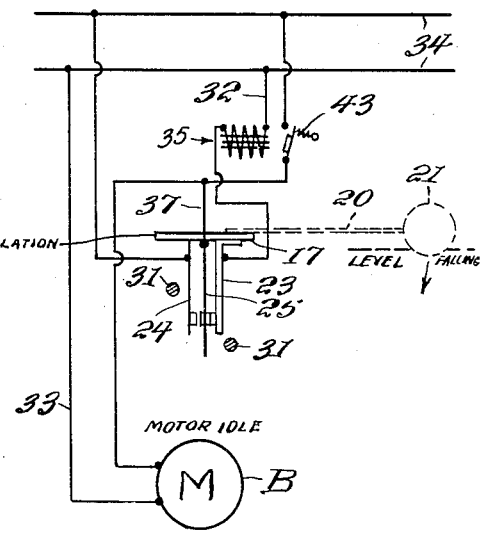

Figure 6 is a view similar to Figure 5 showing the float sinking or falling and the device shifting during this period.

Figure 7:
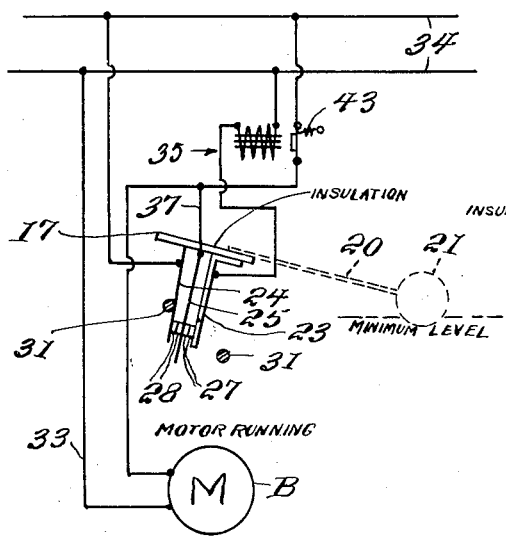

Figure 7 is a view similar to Figure 6 showing the float at minimum low level with the position of the device at this period, and the motor running.

Figure 8:
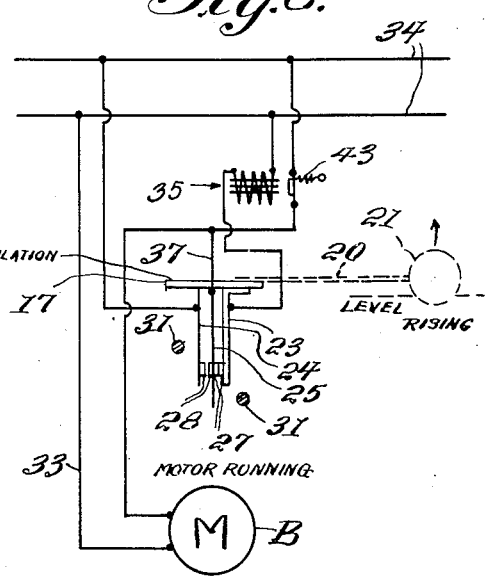

Figure 8 is a view similar to Figure 7 showing the position of the device when the float is rising to maximum level and the motor running.

Figure 9:
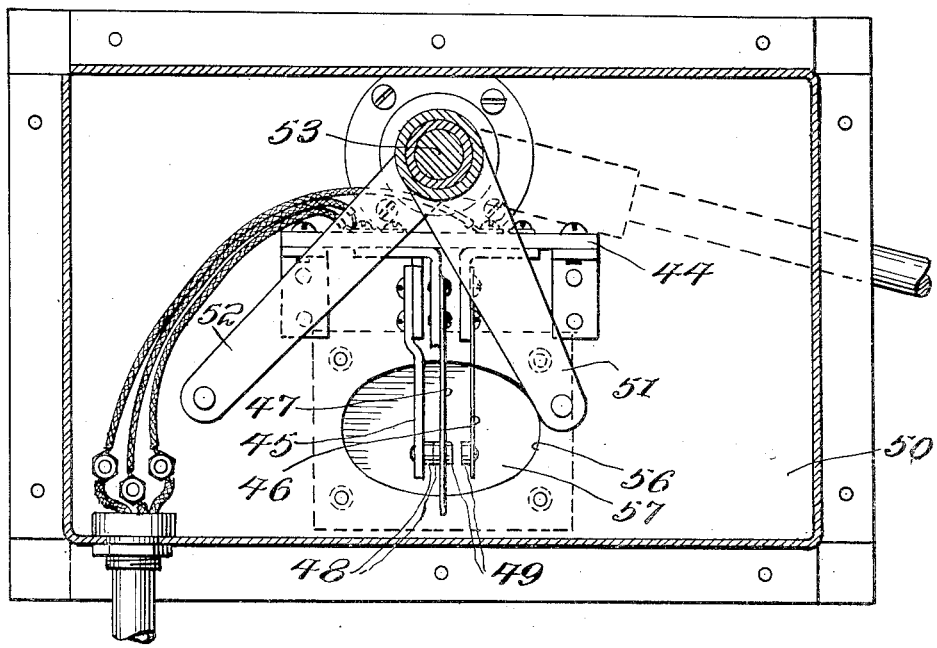

Figure 9 is a view similar to Figure 4 showing a modification of the device.

Figure 10:
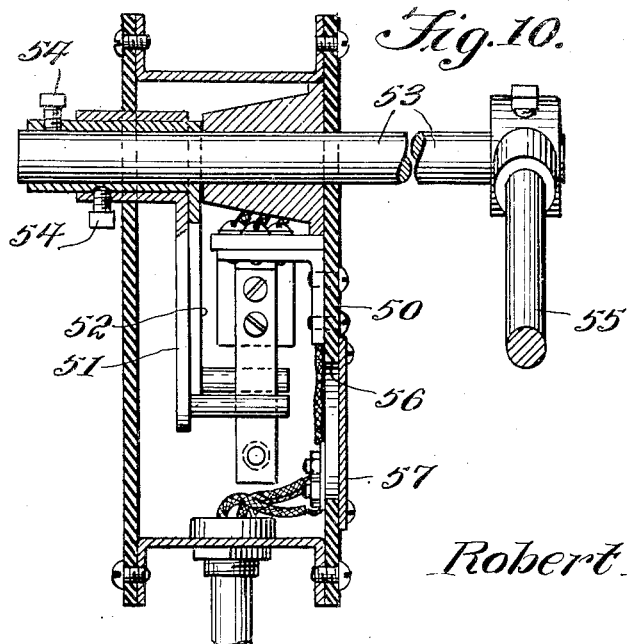

Figure 10 is a view similar to Figure 3 of the modified form shown in Figure 9.

Similar reference characters indicate corresponding parts throughout the several views in the drawings.

Referring to the drawings in detail, particularly Figures 1 to 8, inclusive, A designates generally a portion of a tank for holding water or other liquid, and may be of any desirable construction, B denotes an electric motor, C a force pump driven thereby, and D the device constituting the present invention and hereinafter fully described.

The device D in detail, comprises a bed or base 10, made from any suitable insulating material, which is rigidly supported on a bracket 11 fixed to one vertical wall of the tank A at the top thereof. Secured to the base or bed 10 are spaced vertical insulator panels 12 and 13, respectively, which are of uniform size with respect to each other, and at an elevation spaced from the upper ends, and, preferably on the longitudinal median thereof, is a hollow or tubular arbor or shaft 14, which is horizontally disposed crosswise of such panels, with the end portions suitably fixed therein, as at 15 and 16, respectively, so that this shaft will be non-rotatable.

Suspended from the shaft 14 is a rocking or swinging float carrier 17 having an insulation floor slab 18, and on one of the side hangers 19 of this carrier is fixed the arm 20 of a float 21, the latter being adapted to ride the surface of the liquid content 22 within the tank A in the rise and fall of such content, and this resulting in the rocking of the said carrier for a purpose presently described.

Secured to the under face of the slab 18 are the dependent opposed spaced rigid and flexible outer hangers on contact arms 23 and 24, and the flexible intermediate hanger 25, respectively, the latter being formed with a tripping extension 26 at its free end which extends beyond the free ends of the hangers 23 and 24, and these hangers 23, 24 and 25 are fitted with two confronting pairs 27 and 28, respectively, of electric contacts. One contact of each of the two pairs 27 and 28 are carried by the rigid and flexible hangers 23 and 24, while the other contacts of these pairs are mounted on opposite sides of the hanger 25.

Adjustably swingable on the shaft 14 are tripper arms 29 and 30, respectively, which are made from any suitable insulating material, and support trip lugs or horns 31, the one on the arm 29 being in the path of the extension 26 of the hanger 25, while the lug or horn 31 on the arm 30 is in the path of the flexible hanger 24, so that when the carrier 17 swings in one direction the pair 27 of contacts will separate from each other when the float 21 reaches a maximum high level, they being engaged with each other during the travel of the float 21 between maximum high and minimum low liquid levels within the tank A, and thus opening a magnetic switch 32 in an electric supply line circuit 33 to the motor B so that the latter will be stopped to have the pump C inactive at this period. The line 33 is connected with a power line 34, the magnetic switch circuit 35 with the latter having connections 36 with the hangers 23 and 24, while the connection 37 of the hanger 25 is with the motor line circuit 33.

The arms 29 and 30 are fastened in adjusted position by nut carrying bolts 38 operating in arcuate slots 39 in the panel 12, there being a covering housing 40 fitted to the base or bed 10 and such housing has a clearance 41 for the float arm 20 for the float.

It should be seen from Figures 5 to 8, inclusive of the drawings, and the foregoing that the pump C is stopped when the float reaches maximum high liquid level and such pump starts on the float reaching maximum low level within the tank A, the pump C receives its liquid supply from any suitable source and delivers such supply through connection 42 to the tank A when in operation.

The pair 28 of contacts are brought into engagement with each other when the hanger 24 engages the lug or horn 31 of the arm 30 so that when the float reaches the minimum low level in the tank A the magnetic switch 35 will automatically close to start the motor B for driving the pump C, and thereby forcing liquid into the tank A until the maximum high level has been reached when the motor will be stopped as the magnet of the switch will become deenergized and the switch 35 opens, so that current to the said motor B is shut off. The entire period of descent of the float 21 from maximum high level to minimum low lever within the tank, the motor B is at a standstill and likewise the pump C driven thereby is passive. The switch 35 automatically closes when the float 21 reaches the minimum low level and remains so until the float arrives at the maximum high level, whence such switch opens, the closing of the said switch effects the running of the motor B for the driving of the pump C, and the opening of this switch 35 shuts-off the motor and pump driven thereby. The switch 35 on deenergizing of the magnet thereof is thrown to open position by a spring 43, while the closing thereof is had on energizing the said magnet thereof.

In Figures 9 and 10 of the drawings there is shown a modification of the invention, wherein the carrier 44 for the hangers 45, 46 and 47, for the two pairs 48 and 49, respectively, of the contacts is fixed stationary on the panel 50, and the trip arms 51 and 52, respectively, are adjustably fitted to the arbor 53, by set screws 54, the arbor being rotatably supported and has fixed thereto the float arm 55, thus on movement of the latter the hangers 46 and 47 are controlled by selective engagement of the arms 51 and 52 therewith, the hanger 45 being stationary similarly to the hanger 23 before described.

The panel 50 is provided with an inspection window 56 covered by a removable closure plate 57. The modified form of the invention operates identically to the preferred form thereof as shown in Figures 1 to 8 of the drawings.

What is claimed is:

1. A float actuated switch comprising a pair of spaced parallel insulating panels, a tubular shaft mounted in the upper parts of the panels, a carrier pivotally mounted on said shaft, a float carried by the carrier and extended therefrom, a pair of spaced depending contact arms mounted on the carrier, a depending intermediate contact arm also mounted on the carrier and positioned between the spaced contact arms, contact points carried by the ends of the contact arms, a plurality of tripper arms pivotally mounted on said shaft and depending therefrom, and projections carried by the said tripper arms positioned to be engaged by the said contact arms as the float actuates the carrier.

2. A float actuated switch comprising a pair of spaced parallel insulating panels, a tubular shaft mounted in the upper parts of the panels, a carrier positioned between the panels and pivotally mounted on said shaft, a float carried by the carrier and extended therefrom, a pair of spaced depending contact arms mounted on the carrier, a depending intermediate contact arm also mounted on the carrier and positioned between the spaced contact arms, said intermediate contact arm having an extension at the end thereof, contact points carried by the ends of the contact arms, a plurality of tripper arms having projections extending in the path of the contact arms of the carrier with a projection of one of the tripper arms positioned to be engaged by the extension of the intermediate contact arm and with a projection of another tripper arm positioned to be engaged by one of the contact arms of the pair of contact arms, said contact arms being actuated by the float through the carrier to engage the said projections, and a suitable casing enclosing said elements with the float extended therefrom.

3. A float actuated switch comprising a pair of spaced parallel insulating panels, a tubular shaft mounted in the upper parts of the panels, a carrier positioned between the panels and pivotally mounted on said shaft, a float carried by the carrier and extended therefrom, a pair of spaced depending contact arms mounted on the carrier, a depending intermediate contact arm also mounted on the carrier and positioned between the spaced contact arms, said intermediate contact arm having an extension at the end thereof, contact points carried by the ends of the contact arms, a plurality of tripper arms having projections extending in the path of the contact arms of the carrier with a projection of one of the tripper arms positioned to be engaged by the extension of the intermediate contact arm and with a projection of another tripper arm positioned to be engaged by one of the contact arms of the pair of contact arms, said contact arms being actuated by the float through the carrier to engage the said projections, means adjusting the position for the tripper arms, and a suitable casing enclosing said elements with the float extended therefrom.

4. A float actuated switch comprising a pair of spaced parallel insulating panels, a tubular shaft mounted in the upper parts of the panels, a carrier positioned between the panels and pivotally mounted on said shaft, a float carried by the carrier and extended therefrom, a pair of spaced depending contact arms mounted on the carrier, a depending intermediate contact arm also mounted on the carrier and positioned between the spaced contact arms, said intermediate contact arm having an extension at the end thereof, contact points carried by the ends of the contact arms, a plurality of tripper arms having projections extending in the path of the contact arms of the carrier with a projection of one of the tripper arms positioned to be engaged by the extension of the intermediate contact arm, and with a projection of another tripper arm positioned to be engaged by one of the contact arms of the pair of contact arms, said contact arms being actuated by the float through the carrier to engage the said projections, a solenoid actuated switch adapted to be connected in a motor circuit, and a circuit connecting the solenoid of the said switch to the contact point of the said float actuated switch.

5. A float actuated switch comprising a pair of spaced parallel insulating panels, a tubular shaft mounted in the upper parts of the panels, a carrier positioned between the panels and pivotally mounted on said shaft, a float carrier by the carrier and extended therefrom, a pair of spaced depending contact arms mounted on the carrier, one of said arms being rigid and the other flexible, a depending intermediate contact arm also mounted on the carrier and positioned between the spaced contact arms, said intermediate contact arm having an extension at the end thereof, contact points carried by the ends of the contact arms, a plurality of tripper arms having projections extending in the path of the contact arms of the carrier with a projection of one of the tripper arms positioned to be engaged by the extension of the intermediate contact arm and with a projection of another tripper arm positioned to be engaged by one of the contact arms of the pair of contact arms, said contact arms being actuated by the float through the carrier to engage the said projections, and a suitable casing enclosing said elements with the float extended therefrom.

ROBERT H. IVESON.

REFERENCES CITED

The following references are of record in the file of this patent:

UNITED STATES PATENTS

| Number | Name | Date |
|---|---|---|
| 1,338,987 | Kettering | May 4, 1920 |
| 1,473,761 | Grant | Nov. 13, 1923 |
| 1,479,415 | Jennings | Jan. 1, 1924 |
| 1,491,989 | Kettering | Apr. 29, 1924 |
| 1,492,171 | Jennings | Apr. 29, 1924 |
| 1,518,890 | Aikman | Dec. 9, 1924 |
| 1,710,004 | Persons | Apr. 23, 1929 |

FOREIGN PATENTS

| Number | Country | Date |
|---|---|---|
| 149,069 | Great Britain | Aug. 9, 1920 |
| 524,076 | Great Britain | July 30, 1940 |